May 28, 1935.   E. MENDENHALL ET AL   2,002,908
BEARING STRUCTURE
Filed Sept. 26, 1932   2 Sheets-Sheet 2

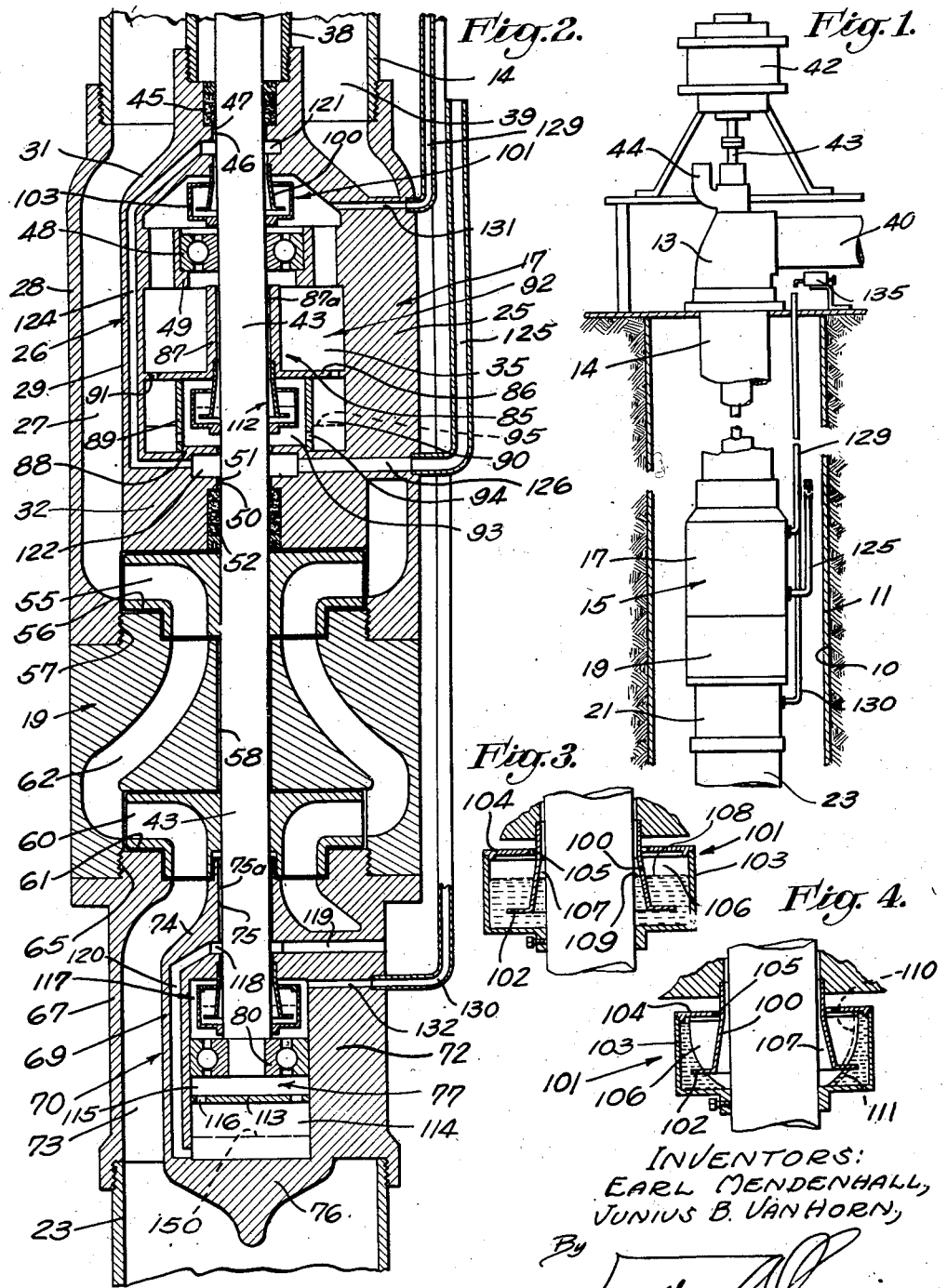

INVENTORS:
EARL MENDENHALL,
JUNIUS B. VAN HORN,
By Earl Mauier
ATTORNEY

Patented May 28, 1935

2,002,908

UNITED STATES PATENT OFFICE 2,002,908

BEARING STRUCTURE

Earl Mendenhall and Junius B. Van Horn, Los Angeles, Calif., assignors to Menhorn, Inc., Los Angeles, Calif., a corporation of California Application September 26, 1932, Serial No. 634,908

21 Claims. (Cl. 308—134)

Our invention relates to submersible structures, and more particularly to a novel form of bearing structure which may successfully operate submerged without danger of the external fluid entering the bearing.

There are many instances in which it is advisable or necessary to provide a bearing positioned submerged in an external fluid which would be injurious to the bearing surfaces should it come in contact therewith. Such a situation is frequently met in the drilling and pumping arts, and it is an object of our invention to provide a bearing structure of novel form which will operate submerged, the present invention comprehending a bearing-enclosing structure in which the lubricating medium may be initially supplied to the structure before submergence or supplied thereto after submergence either continuously or intermittently.

In the preferred embodiment of the invention we have found it desirable to utilize a fluid-packed seal around the shaft, and it is an object of the present invention to provide a structure utilizing a fluid-packed seal thereby effectively preventing any of the external fluid from reaching the bearing surfaces. A further object of the invention is to provide a system in which the pressures on opposite sides of the seal are maintained substantially equal. Furthermore, in the preferred embodiment of the invention the pressures on opposite sides of the structure enclosing the bearing are also substantially equalized.

Other objects of the invention lie in the structure of this pressure-equalizing system and in the novel placement of the elements comprising this system. Thus, it is an object of the present invention to provide a balance chamber or an equivalent 'pressure-transfer means spaced vertically with respect to the bearing chamber, and to utilize a passage communicating with the balance chamber and extending upward to a point adjacent the upper end of the uppermost chamber, thereby maintaining a column of liquid in static balance with the liquid inside the bearing chamber and balance chamber during the time that the unit is being submerged, such a passage also preventing drainage of liquid from the bearing chamber in the event that the level of the external fluid should drop below this chamber.

A further object of the invention is to provide an auxiliary chamber around the shaft above the bearing chamber, this chamber communicating with the balance chamber.

Still another object of the invention is to provide a structure in which a rotating shaft extends upward therethrough and in which a balance chamber is formed below the shaft, while still another object of the invention lies in the novel relationship between an upward extending shaft, a pressure-equalizing means, and a seal, wherein the buoyancy of the lubricating medium is utilized to advantage.

One important application of the present invention is in the deep-well pumping art. It is customary to provide a shaft extending from the top of the well to a pump section submerged in the well liquid. This shaft must be journalled at frequent intervals and the bearing of our invention is well adapted to this use. In other instances the bearing to be hereinafter described may be used in the pump section itself, and it is in this respect that one form of the invention will be particularly described. The desirability of keeping the pumped fluid out of the bearings of such a pump section is universally recognized and many methods of partially effecting this result have been devised. None of these have proved entirely effective and as a result it has been heretofore difficult, if not impossible, to utilize ball bearings in such a pump section.

It is an object of the present invention to provide a bearing which can be successfully utilized in a deep-well turbine pump.

It should not be understood, however, that the present invention is limited to the utilization of a bearing inside the enclosing structure, for other structures may be inserted therein without departing from the spirit of the invention.

Further objects and advantages of the invention will be evident to those skilled in the art from the following description of the preferred embodiments of the invention.

The present invention is a continuation-in-part of our application entitled "Bearing structure", Serial No. 220,382, filed September 19, 1927. That application discloses two systems, one in which the pressure inside the structure increases as the unit is set into operation, and claimed specifically in conjunction with such a pressure-changing means in our copending application, Serial No. 634,911, entitled "Submersible structure", and the other in which the pressure inside the structure is maintained substantially the same as the pressure therearound. The preferred embodiment of the present application is directed more particularly to the latter type of structure, though certain features shown herein are of utility in other systems and are thus not limited to substantial equalization on opposite sides of the enclosing structure.

In the drawing,—

Fig. 1 is a utility view of the invention as applied to a deep-well turbine pump.

Fig. 2 is a vertical sectional view of such a turbine pump embodying our invention.

Figs 3 and 4 are enlarged views illustrating the fluid-packed seal utilized.

Figure 5:
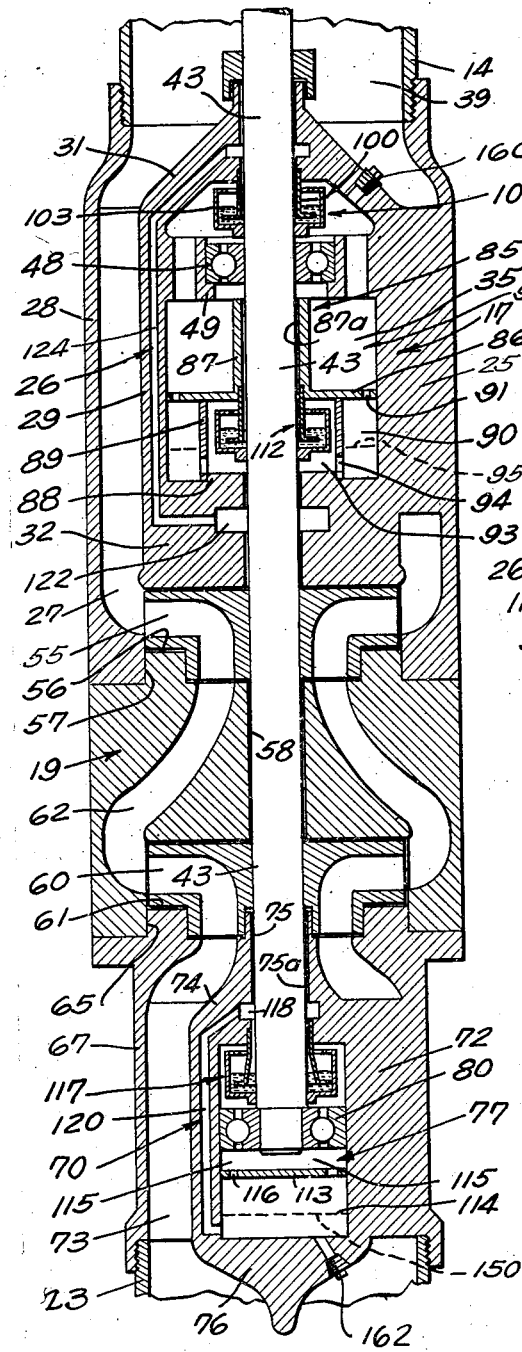
Fig. 5 is a sectional view taken of an alternative form of the invention as applied to a pump.

Referring to the drawings and to Fig. 1 in particular, the numeral 10 represents a well in which is set a well casing 11. Supported over the well 10 at the surface of the ground is a pump head 13 which supports a discharge pipe 14 which extends into the well 10. At the bottom of the discharge pipe and beneath the fluid level of the well is secured a pump section 15, comprising an upper member 17, an intermediate bowl member 19, and a lower member 21. An intake pipe 23 extends downward from the lower member 21.

Referring particularly to Fig. 2 the upper member 17 includes ribs 25 extending inward to support an upper bearing structure 26, there being annular discharge passages 27 formed between an outer shell 28 of the upper member 17 and an inner shell in the form of a cylindrical wall 29 of the upper bearing structure 26. The cylindrical wall 29 is capped by a dome 31 and is closed at its lower end by a base 32, the wall 29, the dome 31, and the base 32 forming a surrounding structure the upper end of which defines an upper chamber 35. Secured to the dome 31 and extending upward to the pump head 13 is an oil string 38. A space 39 between the oil string and the discharge pipe 14 carries pumped fluid to the surface of the ground, discharging this fluid through a pipe 40 of the pump head 13.

A motor 42 positioned at the pump head 13 rotates a pump shaft 43 which extends downward to the pump section 15 through numerous bearings carried by the oil string. The conventional method of oiling these bearings is by supplying oil to the top of the oil string 38 through a pipe 44 shown extending from the pump head 13. A lower end of the shaft passes through a packing 45 in a hole 46 of the dome 31, this hole being only slightly larger in diameter than the shaft 43 to define a clearance space 47 which is at least partially sealed off by the packing 45.

An upper bearing 48 is held in an annular shoulder 49 extending inward from the cylindrical wall 29. This bearing journals the shaft 43 and is shown as comprising a ball bearing. However, any type of bearing such as a sleeve or roller bearing could be used in this capacity.

The shaft 43 passes downward through a hole 50 in the base 32, this hole being slightly larger in diameter than the shaft to provide a clearance space 51 therebetween. A packing 52 may be utilized to seal off the shaft 43 with respect to the base 32.

An upper impeller 55 is secured to the shaft 43 directly below the base 32 and is positioned in an upper impeller chamber 56. This impeller supplies fluid to the passages 27 of the upper member 17.

Secured to the bottom of the upper member 17 as by threads 57 is the bowl member 19. A hole 58 allows the shaft to pass through this bowl member, and a lower impeller 60 is secured to the shaft in a lower impeller chamber 61 of the bowl 19. Passages 62 in the bowl member conduct the fluid from the lower impeller 60 to the upper impeller 55.

The lower member 21 is secured to the bowl member 19, as indicated by the numeral 65, and comprises an outer shell 67 which supports an inner shell comprising a cylindrical wall 69 of a lower bearing structure 70 by means of ribs 72. Annular passages 73 are thus defined, these passages supplying fluid to the lower impeller 60 from the intake pipe 23.

The cylindrical wall 69 of the lower bearing structure 70 is closed at its upper end by a dome 74 having a hole 75 slightly larger in diameter than the shaft 43 to define a clearance space 75a. The wall 69, the dome 74, and a base 76 define a lower chamber 77 which carries a lower bearing 80. This lower bearing is similar to the upper bearing 48 and may be either of the ball, roller, or sleeve type. The bearings 48 and 80 cooperate to journal the shaft 43 in the pump section 15 and to hold the impellers 55 and 60 centrally spaced in the impeller chambers 56 and 61 respectively. By making the bearing 80 slidable in the chamber 77 any expansion in the shaft 43 can be compensated for.

Positioned in the lower part of the upper chamber 35 is a baffle structure 85. This baffle structure comprises an annular plate 86 which extends between the wall 29 and the shaft 43. Extending upward from the plate 86 concentric with the shaft 43 is a cylindrical tube 87 there being a clearance space 87a between the shaft and the tube. Extending between the plate 86 and a shoulder 88 of the base 32 is a cylindrical tube 89 which is also concentric with the shaft 43. The annular spaces between the plate 86, the cylindrical wall 29, and the tube 89 comprises a balance chamber 90 forming the pressure-transfer means of this form of the invention. This balance chamber 90 communicates through one or more openings 91 in the plate 86 with an upper bearing chamber 92 which consists of that portion of the chamber 35 which is above the plate 86. So also, the balance chamber communicates with an annular seal space 93 between the shaft 43 and the tube 89 through small openings 94. The bearing chamber 92 and the upper end of the balance chamber 90 are substantially filled with a liquid lubricating medium, and the function of the baffle 86 is to form a relatively quiet balancing chamber where a body of the lubricating medium and a body of the external fluid being pumped may be in quiescent contact, the surface of contact being indicated by the numeral 95. The function of this chamber will be described more in detail hereinafter.

Securely mounted in the dome 31 of the upper bearing chamber 35 is an apron 100 extending downward around the shaft 43, this apron forming a part of an upper fluid-packed sealing means 101. Referring particularly to Fig. 3, the apron 100 is flared at its lower end and provides an annular radial plate 102. Secured to the shaft 43 and enclosing the plate 102 is a cup 103 providing a cover 104 securely held in place by means not shown. The cover surrounds the apron 100, leaving a clearance space 105 between the cover and this apron. This cup contains a body of mercury or other high density sealing fluid, the apron 100 dipping into this sealing fluid. The sealing fluid thus forms a seal between a space 106 formed between the cup 103 and the apron 100 and an annular clearance space 107 formed between the shaft 43 and the apron 100. This apron 100 thus divides the surface of the mercury or other sealing liquid into a primary surface 108 and a secondary surface 109, these surfaces respectively bounding the spaces 106 and 107.

The space 106 is in communication with the bearing chamber 92 through the clearance space 105, while the space 107 has access to the external fluid in a manner to be hereinafter described. When the shaft is rotated, the sealing fluid also rotates and is thrown outward in the cup. In the absence of the radial plate 102 the surface of the sealing fluid will assume the shape of a paraboloid. We have found, however, that when the stationary apron extends into the body of sealing fluid, there is a normal tendency for the secondary surface 109 to be displaced outward with respect to the primary surface 108 when the shaft is rotating. Thus, even if the pressures on opposite sides of the apron 100 are exactly equal, the surfaces 108 and 109 will tend to respectively assume the dotted line positions 110 and 111 shown in Fig. 4, this type of seal having the inherent tendency to displace an excessive amount of the sealing liquid around the outer end of the apron 100 so as to bring the surfaces into their dotted line positions. It is, of course, essential that the surface 109 should never reach the outermost portion of the apron 100, otherwise a portion of the external fluid will move around the apron 100 to contaminate the lubricating medium.

We have found, however, that this tendency toward displacement of the primary and secondary surfaces 108 and 109 is effectively counteracted by the buoyancy of the lubricating medium. In this connection it will be understood that the lubricating medium is of somewhat lower density than the density of the surrounding fluid so that even if the pressures between the lubricating medium and the surrounding fluid are equalized in the balance chamber 90 the lubricating medium, being lighter than the external fluid, will have a buoyant effect, thus exerting on the primary surface 108 a slightly greater pressure than that exerted on the secondary surface 109. This action thus forces the surfaces 108 and 109 into the position shown in full lines in Fig. 4, thereby eliminating danger of the external fluid entering the bearing chamber. This type of seal thus finds particular utility in sealing the shaft which extends upward from a bearing chamber, for the buoyant effect of the lubricating medium cooperates in insuring proper operation of the seal.

A similar intermediate fluid-packed seal 112 is placed in the annular seal space 93. In this case the apron of the seal is securely mounted in the tube 87 and the cup is secured to the shaft immediately above the base 32.

Placed in the lower chamber 77 below the bearing 80 is a baffle plate 113 which divides the chamber into a lower balance chamber 114 and lower bearing chamber 115. The baffle 113 bounds one or more openings 116 through which the bearing chamber 115 and the balance chamber 114 are in communication. The openings 116 are sufficiently small to prevent agitation in the balance chamber due to the rotation of the shaft.

A lower fluid-packed seal 117 is placed in the lower bearing chamber 115 above the bearing 80. The apron 100 of this seal 117 is secured in the lower end of the hole 75 formed through the dome 74, and the cup of the seal is secured to the shaft to enclose the radial plate 102 of the seal.

An enlarged space or auxiliary chamber 118 is formed intermediate the ends of the clearance space 75a and is by-passed to the exterior of the lower member 21 by a passage 119 through one of the ribs 72. A passage 120 extends vertically through the cylindrical wall 69 and communicates between the auxiliary chamber 118 and the lower portion of the lower balance chamber 114.

The clearance space 47 above the seal 101 is enlarged intermediate its ends to form an auxiliary chamber 121. The clearance space 51 of the base 32 is enlarged intermediate its ends to form a lower auxiliary chamber 122. These two chambers 121 and 122 communicate with each other through a passage 124 formed in the cylindrical wall 29 of the upper bearing structure 26. The chamber 122 is also in communication with a stand-pipe 125 through a bore 126. The stand-pipe 125 extends upward outside the pump section to a point above the bearing chamber 92 and preferably substantially opposite the upper packing 45 for a purpose to be described.

The upper ends of the upper and lower bearing chambers 92 and 115 respectively are in communication with oil pipes 129 and 130 through passages 131 and 132 respectively. The oil pipes 129 and 130 extend upward adjacent the discharge pipe 14 to the surface of the ground. A sight oil-feed device 135 supplies oil to the upper ends of the oil pipes 129 and 130 which carry it to the bearing chambers below.

The installation and operation of our device is substantially as follows:

The pump is assembled and the cups 103 filled with the correct amount of mercury. Oil is poured into the stand-pipe 125 until it is substantially full. At this time oil will substantially fill the upper bearing and balance chambers and will rise in the oil supply pipe 129 to a level equal to the level in the stand-pipe. Oil is then supplied to the pipe 130 until it runs out of the passage 119. At this time the lower bearing and balance chambers will be substantially filled with oil and the pump can be lowered into the external fluid. No oil will leak out during this lowering due to the sand-pipe 125 and the position of the passage 119.

As soon as the passage 119 and the stand-pipe 125 are submerged in the external fluid, a pressure is built up therein equal to the pressure at the depth of submergence. So also, the oil in the sand-pipe 125 and passages 119 and 120 will be displaced by the external fluid due to its greater density.

As the pump section is lowered the pressure exerted by the external fluid increases. Considering the action which takes place in the lower bearing structure it will be apparent that this action forces a portion of the external fluid into the lower end of the balance chamber 114. The increased pressure will force the lubricating medium upward in the oil pipe 130 until a static balance is effected. This balance will take place when the pressure head on the oil in the oil pipe is substantially equal to the pressure of the head of fluid above the passage 119 at which time a balance will be effected. Inasmuch as the cross-sectional area of the lower balance chamber 114 is very large in comparison to the cross-sectional area of the pipe 130, it follows that a small variation in level of the surface of contact 150 in the balance chamber 114 will cause a large variation in level in the oil pipe 130. This ratio is usually designed to be several hundred to one.

The level of the lubricating medium in the oil pipe 130 is thus maintained substantially the same as the level of the external fluid in which the pump section is submerged, any difference in level being due to the difference in density between the lubricating medium and the external fluid. Should the level of the external fluid rise, the pressure in the balance chamber 114 will be increased and the surface of contact 150 will move upward a slight distance, thus materially raising the level in the oil pipe 130, the change in level corresponding to the change in pressure effected by the rise in level of the external fluid. Vice versa, a lowering of fluid level, or, what would amount to the same thing, a rise in oil level in the oil pipe 130, would cause oil to flow into the bearing chamber 115 and slightly lower the surface of contact 150, forcing fluid out of the passage 119. It will thus be apparent that only slight movements of the surface of contact 150 are necessary in order to maintain the system in balance.

A similar compensating action takes place in the upper bearing chamber 92. Here, as the pump is lowered and as the fluid pressure is increased, fluid flows down the stand-pipe 125 to the chamber 122, escaping upward through the clearance space 51 between the shaft and the walls of the hole 50 into the annular sealing space 93, whence it passes to the lower part of the balance chamber 90 through openings 94. The external fluid and the oil separate at a surface of contact indicated by the numeral 95. As the fluid entry continues, this surface 95 is raised in the balance chamber, forcing oil through the opening 91 and the passage 131 and up the oil tube 129, raising the level therein until the pressures of the external fluid and lubricating medium are equal. The cross-sectional area of the balance chamber 90 is also several hundred times larger than the cross-sectional area of the oil pipe 129 so that a small variation in the level of the surface of contact 95 will cause a large variation in level in the oil tube 129.

Coming now to the particular part played by the fluid-packed seals, we will first trace the possible paths for both the external fluid and the oil. In normal operation, the balance chambers 90 and 114 contain contacting bodies of both the external fluid and the oil, the latter, being the lighter, assuming an uppermost position. External fluid may thus fill the stand-pipe 125, the bore 126, and the chamber 122, in which case it can reach the lower part of the balance chamber through the clearance space 51, the space 93, and the holes 94. While in the space 93 the external fluid can fill the space 106 of the seal 112 through the clearance space 105 thereof, exerting a downward pressure on the mercury surface 108. This pressure is counteracted by the pressure of the body of oil in the space 107 between the shaft and the apron, inasmuch as the space 107 communicates with the bearing chamber 92 through the clearance space 87a between the tube 87 and the shaft 43. The pressure of the oil acting upon the surface 109 of the mercury is maintained substantially equal to the pressure of the external fluid communicating with the surface 108 through the action of the balance chamber 90.

It is also possible for external fluid to pass from the upper impeller chamber 56 into the chamber 122 if the packing 52 around the shaft becomes worn. This is not objectionable unless wear continues to such a point that an appreciable percentage escapes from the impeller chamber through the bore 126. Any leakage through the packing 52 may flow upward through the stand-pipe 125 and will not upset the pressure equilibrium maintained.

Under certain conditions it is also possible for the external fluid to occupy the passage 124 and the auxiliary chamber 121 of the upper bearing structure 26. In this event the external fluid will be in communication with the space 107 of the upper seal 101, reaching this space through the clearance space between the shaft 43 and the walls of the hole 46. In this event, the pressure of the external fluid on the mercury surface 109 in the space 107 will be substantially equal to the pressure of the oil which communicates with the space 106 of the upper seal 101, disregarding the buoyant effect of the oil previously mentioned, inasmuch as the pressures of the oil and the fluid are made equal in the balance chamber 90.

In the lower bearing member 70, the external fluid fills the passage 119 and the auxiliary chamber 118 when the pump is in normal operation. Inasmuch as the auxiliary chamber 118 communicates with the space 107 of the lower seal 117, external fluid will fill this space 107 and exert a pressure on the mercury therein substantially equal to the pressure of the external fluid outside the pump.

External fluid also normally fills the bore 120, and enters the lower part of the balance chamber 114 where it separates from the oil at the surface of contact 150. Oil in the lower bearing chamber 115 fills the space 106 of the lower seal 117 so that the mercury in the space is subjected to a pressure equal to the pressure of the oil in the bearing chamber 115. Inasmuch as the oil and external fluid are in contact at the surface of contact 150, the pressures will be exactly equal at this surface. However, the buoyancy of the oil tends to lower the surface 108 with respect to the surface 109 when the seal is in operation, as previously set forth, the buoyancy of the oil thus helping to maintain the sealing liquid in proper position. External fluid can also reach the space 107 of the seal 117 from the lower impeller chamber 61 by passing through the clearance space 75a between the shaft 43 and the walls of the hole 75. No packing or other seal is shown in this space although one might be used if it is found that the leakage through this space and through the passage 119 is large.

The normal way of supplying additional oil to the bearing chambers 92 and 115 is through the sight oil-feed device 135 located at the top of the well. By continually dripping a small amount of oil through the oil pipes 129 and 130, the upper and lower bearing chambers 92 and 115 will always be filled with oil. As before explained, if the pressure of the oil in either of the pipes 129 or 130 exceeds the pressure of the external fluid, the surfaces of contact 150 and 95 between the oil and the external fluid will be lowered. It is entirely possible that sufficient oil be supplied to the pipe 129 to cause the oil in the balance chamber 90 to completely displace the external fluid in the lower part thereof and even fill the seal space 93 and discharge into the bore 126 until it will rise in the standpipe 125. In this event, there will be no external fluid in the upper bearing structure 26. Should the external fluid pressure become greater at this time, due to a rise in the fluid level in the well, the stand-pipe 125 would again deliver external fluid to the balance chamber 90 until the level of the oil in the pipe 129 would be substantially equal to the fluid level in the well as previously described.

By thus supplying oil continuously or intermittently to the pipe 130, the external fluid in the lower balance chamber 114 also would be displaced, and oil would completely fill this space and rise in the bore 120 and the passage 119 and escape into the well. The pressure balance would, however, be maintained at all times.

It is also possible in certain installations to connect the pipes 129 and 130 together so that only one oil pipe extends from the surface of the well.

It is also possible to preliminarily fill the bearing chambers with oil and thereafter allow the balance chambers 90 and 114 to take care of any difference in pressure between the oil and the external fluid. This is made possible only because the bearing structures are made absolutely fluid-tight by the fluid-packed seals so that no oil can leave the bearing chambers so long as the pressures on the oil and fluid are maintained substantially equal.

The oil and the external fluid in the balance chambers 90 and 114 are substantially at rest so there is no tendency for the two to mix or emulsify. This result is effected by the baffles 85 and 113 which prevent any rotating tendency of the oil in the bearing chambers from reaching the oil in the balance chambers below.

If it is desired to maintain the oil and the external fluid separated, it is possible to use an annular plate which will slide vertically in the balance chamber 90 to separate the oil and the external fluid. If such a plate is used, it may be so designed that its density will be between that of the oil and the external fluid so that it will float on the surface of the external fluid. In other systems the plate may be sealed with respect to the walls of the balance chamber and freely move therein to permit pressure transfer. A similar plate might also be used in the lower balance chamber 114. Such plates are, however, usually unnecessary.

Certain features of the apparatus are not necessary to the perfect functioning of the bearings of our invention. In Fig. 5 we show a pump similar to that shown in Fig. 2 but with some of the pipes and passages absent therefrom, our copending application, supra, containing claims specific to such a combination including as one element a pumping or pressure-changing means. For instance, Fig. 5 shows no oil tubes 129 or 130, and thus no passages 131 and 132 communicating between such oil pipes and the bearing chambers 92 and 115. Neither does this form of our invention have a stand-pipe 125, nor a bore 126 communicating between the auxiliary chamber 122 and the stand-pipe. Furthermore, the packings 52 and 45 are eliminated as is also the passage 119 connecting the auxiliary chamber 118 to the fluid surrounding the pump. A filler plug 160 screws into the dome 31 of the upper bearing structure 26 and permits an initial filling of the bearing chamber 92 and the balance chamber 90 with oil. Similarly, a plug 162 permits the initial filling of the lower bearing chamber 115 and the lower balance chamber 114 with oil. This form of the invention also does not show an oil string 38.

In operating this form of our invention the bearing chambers and balance chambers are initially filled with oil and the pump is lowered into place. External fluid may pass into the chamber 122 only from the impeller chamber 56, passing upward through the clearance space 51. Any decrease in the volume of the oil, as by contraction or a minute leakage through imperfections in the walls, would be compensated for by entry of a small amount of the external fluid into the balance chamber 90. Such a leakage is extremely improbable, however, and normally external fluid will not enter the bearing chamber 92 nor occupy any major portion of the balance chamber 90. The incompressibility of the oil prevents excessive change in the level of such a surface of contact.

Similarly, external fluid might pass from the lower impeller chamber 61 downward to the auxiliary chamber 118 and the space 107 of the lower seal 117 by passing through the clearance space 75a between the shaft 43 and the walls of the hole 75. This external fluid could not reach the bearing due to the seal.

It should be noticed that in the form shown in Fig. 5 the pressure of the oil in the bearing chambers will normally be larger than the pressure when a form of pump such as is shown in Fig. 2 is used. This is due to the fact that in the latter case, the auxiliary chambers 122 and 118 are by-passed to the exterior of the pump and thus communicate with the external fluid in the well, but in the former case the only communication to these chambers is from the impeller chambers. During the operation of the pump it would be apparent that the pressure in the impeller chambers is normally greater than the pressure of the external fluid surrounding the pump. Even though the pressure on the oil in the bearing chambers is substantially higher in the form shown in Fig. 5, the pressures on the mercury in the space 107 and 106 in each of the fluid-packed seals are substantially equal.

While packings have not been shown in the alternative form of the invention, as shown in Fig. 5, it is within the scope of our invention to use them. They might offer a valuable function in keeping the oil sealed in the bearing chamber 92 while the pump was being lowered.

It is also possible to use an oil string with the form of the invention shown in Fig. 5. In this event, oil might be supplied to the bearing chambers through the oil string, passing into the upper bearing chamber through the passage 124 and into the lower bearing chamber by forming another passage communicating between the chamber 121 and the bore 120. Such a passage is not shown but its use would fall within the scope of our invention.

Further, it is unnecessary to use a balance chamber containing contacting liquid bodies for equalizing the pressure between the oil and the external fluid. Any means of equalizing these pressures, such as a diaphragm, a bellows, or a form of siphon, could be used to separate the oil in the bearing chamber from the external fluid. The action of such a bellows arrangement would be substantially the same as the action of the balance chambers. By having such an arrangement it is not necessary that the external fluid and oil be of different specific gravities.

It should be clear that while we have described the bearing structure of our invention in combination with a turbine pump, we do not wish to be limited to this installation. In the event that it is desired to journal any shaft, two types of bearings are possible, depending upon whether the shaft is to pass entirely through the bearing structure or merely enter therein. The first type is illustrated in the upper bearing structure 26, while the latter is shown in the lower bearings structure 70. Any means of supporting such bearing structures might be used. The bearing structures might be supplied with oil through an oil pipe such as the pipe 130, or they may be initially packed with oil and be of a form similar to those shown in Fig. 5.

Figure 6:
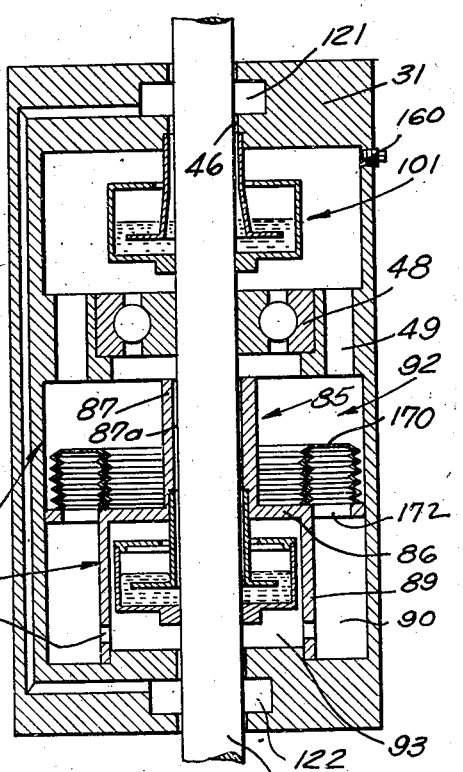
Figs. 6 and 7 illustrate alternative forms of the upper and lower bearing structures respectively.
Figure 7:
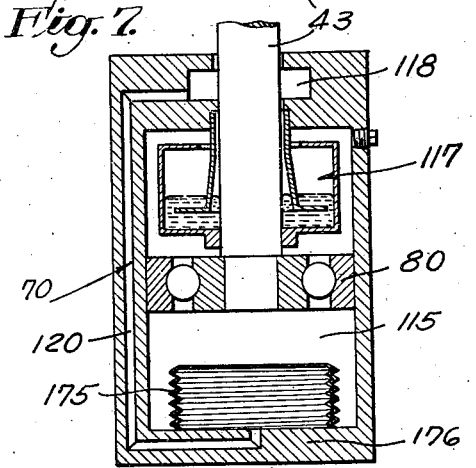

Detached bearings such as these are shown in Figs. 6 and 7. Here each type of bearing structure is shown by itself. Such bearings would find one very valuable use in supporting a pump shaft in a deep well pump. With their use it would be unnecessary to surround the shaft with an oil string as the bearings could be supported directly in the discharge pipe without fear of the fluid passing therethrough entering the bearings themselves. These bearings are shown with bellows for equalizing the pressures.

The construction shown in Fig. 6 has an annular bellows 170 secured to the annular baffle plate 86 and communicating with what was the balance chamber 90 through openings 172. The construction shown in Fig. 7 has a bellows 175 secured to a bottom plate 176 corresponding to the base 76 of the preferred form. The bore 120 in this form communicates with the interior of the bellows 175 through the plate 176. In each case the bellows 170 and 175 serve as a pressure-equalizing means between the fluid and the oil and effect a positive separation of fluid and oil.

In these forms of the invention the pressures on opposite sides of the enclosing shell are maintained substantially equal regardless of the change in pressure thereabout. This result is effected through the bellows 170 and 175. In addition, the external fluid is separated from the lubricating medium by the use of seals similar to those previously described.

One of the features of the invention is to substantially equalize the pressures on opposite sides of a shell. In the forms of the invention shown in Figs. 6 and 7 a single-walled shell is used, while in the form shown in Fig. 2 the structure can be considered as a double-walled shell or a single-walled shell with passages therethrough for conducting the pumped fluid. In all of these forms the pressure inside the structure is maintained substantially equal to the pressure of the external fluid at the depth of submergence. In Fig. 5, however, this is not necessarily the case, for while such equalization is effected when the unit is not in operation, the rotation of the impellers may build up a pressure greater than the pressure at the depth of submergence. The pressures inside and outside the bearing structures 26 and 70 are still substantially equal for the pressure on the outside thereof is the pressure as changed through the operation of the unit, this changed pressure being also transmitted through the balance chambers to the interior of these bearing structures. Thus, all forms of the invention include some type of an enclosing shell with a pressure-transfer means acting between the interior and exterior thereof.

The term "oil" has not been used in a limiting sense. Any lubricating medium might be used depending on the type of bearing utilized. Further, this term "lubricating medium" has been used to designate the liquid inside the structure and has not been used in a limiting sense of defining the properties of this liquid. Its lubricating properties are not the sole criterion in its selection. For instance, this liquid must not be such as would dissolve any material amount of the external fluid contacting therewith, otherwise the liquid in the structure might be contaminated to an undesirable extent. Thus, the lubricating medium must be selected with reference to the external fluid. If the external fluid was of lower density than the lubricating medium, other changes in the balancing structure would necessarily be made. Such changes are within the scope of the invention and will be readily apparent to those skilled in the art.

It should not be understood that we are limited to the exact structures shown nor to the exact placement of the elements. While this placement has been found to be particularly advantageous other constructions will be at once apparent to those skilled in the art. Thus, while the balance chambers may most conveniently be positioned in the lower portions of the structures, our invention is not necessarily limited to this construction. An important feature of the present invention lies in the use of the auxiliary chambers in communication with the seals, as well as in the utilization of a vertically extending passage communicating with the balance chamber and extending to a point adjacent the upper end of the uppermost chamber of the bearing structure thereby preventing flow of the lubricating medium from the bearing during the lowering, and preventing drainage of the bearing chamber should the level of the external fluid fall below the bearing structure.

We claim as our invention:

1. A bearing structure adapted to operate submerged in any fluid, comprising: walls forming a bearing chamber, said bearing chamber being substantially filled with a lubricating medium; a bearing in said bearing chamber; a vertical shaft extending into said bearing chamber and journalling in said bearing; seal means around said shaft for completely separating said lubricating medium in said chamber and said fluid in which said bearing structure is submerged; walls forming a balance chamber below said bearing chamber and containing bodies of said lubricating medium and said fluid in pressure-transferring relationship; passage means communicating between the upper end of said balance chamber and said bearing chamber; and means for preventing said lubricating medium from escaping from said bearing chamber should the level of said fluid fall below the level of said lubricating medium.

2. In a submersible bearing structure adapted to be submerged in an external fluid, the combination of: an enclosing structure containing a lubricating medium; a rotatable shaft extending upward through said enclosing structure; a bearing in said enclosing structure and journalling said shaft; a seal at the junction of said shaft and said enclosing structure; and a baffle extending across the interior of said enclosing structure below the lower end of said shaft to define a balance chamber in the lower part of said enclosing structure and communicating with said external fluid and with said lubricating medium, said balance chamber containing bodies of said external fluid and said lubricating medium in pressure-transferring relationship, said baffle below the lower end of said shaft preventing the turbulence set up in said lubricating medium due to the rotation of said shaft from reaching said balance chamber.

3. A bearing structure adapted to operate submerged in a fluid, comprising: a surrounding structure defining a bearing chamber; a bearing means in said chamber; a shaft journalled in said bearing means and extending through said surrounding structure and through said bearing chamber, said bearing chamber containing a body of liquid lubricating medium; a pair of liquid seals preventing access of said fluid to said bearing chamber, each seal comprising a body of sealing liquid in pressure-transferring relationship with both said lubricating medium and said fluid whereby the bodies of sealing liquid in said seals are displaceable should a pressure difference between said fluid and said lubricating medium exist; walls including a passage communicating with each of said seals and equalizing the pressures applied to said seals; and walls forming an opening communicating between said passage and the fluid in which said bearing structure is submerged to supply said fluid to said passage.

4. In a structure adapted to be submerged in a fluid, the combination of: a surrounding structure providing a chamber; a baffle extending across said chamber and forming a balance chamber in the lower part of said chamber, there being a bearing chamber in said surrounding structure above said baffle, said bearing and balance chambers being in communication and containing a lubricating medium; walls forming a passage communicating between said balance chamber and said fluid whereby said balance chamber contains pressure-equalized bodies of said lubricating medium and said fluid; a shaft extending downward into said bearing chamber and journalled therein, the lower end of said shaft terminating above said baffle; and a sealing means for sealing the junction of said shaft and said surrounding structure.

5. A bearing structure adapted to operate submerged in a fluid, comprising: walls defining a bearing chamber containing a body of lubricating medium; a bearing in said chamber; a vertical shaft extending into said chamber and journalled in said bearing structure; walls forming a balance chamber below said bearing chamber and containing bodies of said lubricating medium and said fluid in pressure-transferring relationship; and walls defining a passage communicating with the lower portion of said balance chamber and opening on said fluid at a position near the upper end of said bearing chamber to prevent said lubricatnig medium from flowing from said bearing chamber should the level of said fluid fall below said bearing structure.

6. In a structure adapted to be submerged in a fluid, the combination of: walls defining a bearing chamber and a balance chamber vertically disposed relative to each other, one end of said balance chamber communicating with said bearing chamber, said bearing chamber containing a lubricating medium; walls defining a passage communicating with another end of said balance chamber and communicating with said fluid at a position near the upper end of said structure whereby fluid may enter said passage at said position and partially fill said balance chamber in pressure-transferring relationship with said lubricating medium; a shaft extending into said bearing chamber; a bearing means in said bearing chamber for journalling said shaft; and a sealing means sealing the junction of said shaft and said first-named walls.

7. In a structure adapted to operate submerged in an external fluid, the combination of: a surrounding structure defining a bearing chamber and a balance chamber vertically disposed with respect to each other, said bearing chamber and a portion of said balance chamber containing a liquid lubricating medium; walls defining an opening through which said bearing chamber communicates with one end of said balance chamber; walls defining a passage communicating with the other end of said balance chamber and extending upward to communicate with said external fluid at a position near the upper end of the uppermost of said chambers whereby said external fluid has access to said balance chamber through said passage, said balance chamber containing bodies of said external fluid and said lubricating medium in pressure-transferring relationship with each other; and a rotatable shaft extending into said bearing chamber.

8. In a bearing structure adapted to be submerged in an external liquid, the combination of: walls defining a bearing chamber containing a body of liquid lubricating medium; walls forming an auxiliary chamber above said bearing chamber; walls defining a space communicating between said external liquid and said auxiliary chamber; a shaft extending upward from said bearing chamber and through said auxiliary chamber; walls forming a balance chamber below said auxiliary chamber and communicating with said bearing chamber to receive a portion of said liquid lubricating medium; and walls forming a passage communicating with said balance chamber and extending upward to communicate with said annular chamber whereby the pressure in said annular chamber is transmitted to said balance chamber and thus to said bearing chamber.

9. In a bearing structure adapted to be submerged in an external liquid, the combination of: walls defining a bearing chamber containing a liquid lubricating medium; a shaft extending upward from said bearing chamber; walls around said shaft above said bearing chamber and defining an auxiliary chamber around said shaft communicating with said external liquid; sealing means around said shaft and separating said auxiliary chamber from said bearing chamber; walls forming a balance chamber below said auxiliary chamber and in open communication with said bearing chamber so as to contain a body of said liquid lubricating medium; and walls defining a passage communicating between said balance chamber and said auxiliary chamber.

10. A combination as defined in claim 9 in which said shaft extends from the upper end of said auxiliary chamber through one of said walls thereof to define a clearance space communicating between said auxiliary chamber and said external liquid.

11. A combination as defined in claim 9 in which said shaft extends from the upper end of said auxiliary chamber through one of said walls thereof to define a clearance space communicating between said auxiliary chamber and said external liquid, and including means for controlling the flow of external liquid through said clearance space.

12. In a structure adapted to be submerged in an external fluid, the combination of: walls forming a bearing chamber containing a liquid lubricating medium of a density lower than the density of said external fluid; a rotatable shaft extending downward into said bearing chamber through the uppermost of said walls whereby the buoyancy of said lubricating medium with respect to said external fluid tends to force said lubricating medium upward through the junction of said shaft and said walls; a seal at said junction, the outer portion of said seal communicating with said external fluid and the inner portion thereof communicating with said lubricating medium; and walls forming a balance chamber containing pressure-equalized bodies of said external fluid and said lubricating medium whereby the pressures thereon are equalized in said balance chamber, the buoyancy of said lubricating medium maintaining the pressure on the inner portion of said seal slightly greater than the pressure of said external fluid communicating with the outer end thereof.

13. In a structure adapted to be submerged in an external fluid, the combination of: walls forming a bearing chamber containing a liquid lubricating medium of a density lower than the density of said external fluid; a rotatable shaft extending downward into said bearing chamber through the uppermost of said walls; means for substantially equalizing the pressures of said external fluid and said lubricating medium at a level below said junction, said means including walls defining a balance chamber below said junction and communicating with said lubricating medium in said bearing chamber and with said external fluid, said balance chamber containing bodies of said lubricating medium and external fluid in pressure-transferring relationship; a fluid-packed seal at said junction end of the type having a tendency for the sealing fluid to be displaced outward when said shaft is rotating, said seal comprising a cup means rotating with said shaft and carrying said sealing fluid, and a stationary apron around said shaft and extending into said sealing fluid to divide the surface of said sealing fluid into a primary surface between said apron and said shaft and a secondary surface between said apron and said cup, said tendency to displace said sealing fluid outward acting to raise said secondary surface with respect to said primary surface, said lubricating medium communicating with said secondary surface; and walls forming a passage communicating between said external fluid and said primary surface of said sealing liquid for transmitting the pressure of said external fluid to said primary surface whereby the buoyancy of said lubricating medium relative to said external fluid acts to depress said secondary surface to counteract said tendency toward outward displacement of said sealing fluid.

14. A combination as defined in claim 13 in which said means include a balance chamber containing pressure-transferring bodies of said lubricating medium and said external fluid, and includes walls defining a passage opening on said balance chamber and communicating with said external fluid at a level substantially corresponding to the level of said seal.

15. In a submersible bearing structure adapted be submerged in an external fluid, the combination of: an enclosing structure containing a lubricating medium; a rotatable shaft extending upward through said enclosing structure; a bearing in said enclosing structure and journalling said shaft; a seal at the junction of said shaft and said enclosing structure; a baffle extending across the interior of said enclosing structure below the lower end of said shaft to define a balance chamber in the lower part of said enclosing structure and communicating with said external fluid and with said lubricating medium, said balance chamber containing bodies of said external fluid and said lubricating medium in pressure-transferring relationship; and a pipe in open communication with said lubricating medium in said enclosing structure and extending upward to a point above the surface of said external fluid, the pressure-transfer effected by said balance chamber acting to force said lubricating medium upward in said pipe until a static balance between said fluid and said lubricating medium is reached, said pipe being of much smaller cross-sectional area than said balance chamber whereby a small change in the relative amounts of said bodies in said balance chamber effects a large change in the level of said lubricating medium in said pipe.

16. A combination as defined in claim 9 in which the lower end of said shaft terminates above said balance chamber and in which said balance chamber contains bodies of said lubricating medium and said external liquid, and including a pipe of much smaller cross-sectional area than said balance chamber and communicating with said lubricating medium, said pipe extending upward above said bearing chamber whereby said balance chamber forces a portion of said liquid lubricating medium upward in said pipe until a static balance is reached between said liquid lubricating medium and said external liquid in said balance chamber.

17. A combination as defined in claim 9 including an upward-extending neck above said auxiliary chamber and through which said shaft extends, and including means rotatable with said shaft and extending downward around said neck but spaced a slight distance therefrom to define a space through which said external liquid may enter said auxiliary chamber.

18. A combination as defined in claim 9 in which said shaft extends from the upper end of said auxiliary chamber through one of said walls thereof to define a clearance space communicating between said auxiliary chamber and said external liquid, and including sealing means around said shaft to close said clearance space.

19. In a structure adapted to be submerged in an external fluid, the combination of: an upward-extending shaft; bearing means for said shaft; walls defining a chamber around said shaft and including an upper wall through which said shaft extends; a seal at the junction of said shaft and said upper wall, the outer portion of said seal communicating with said external fluid and the inner portion of said seal communicating with said chamber, said chamber containing a medium of lower density than said external fluid whereby the buoyancy of said medium with respect to said external fluid tends to increase the pressure on said inner portion of said seal over and above the pressure on said outer portion of said seal; and pressure-transfer means below said chamber and communicating therewith to receive a portion of said medium and communicating with said external fluid whereby the pressures on said medium and said external fluid are substantially equalized at the level of said pressure-transfer means, the buoyancy of said medium maintaining the pressure on said inner portion of said seal slightly greater than the pressure of said external fluid on said outer portion of said seal.

20. In a structure adapted to be submerged in a fluid, the combination of: an enclosing structure; a shaft extending from said enclosing structure; walls in said enclosing structure and dividing the interior thereof into a bearing chamber containing a lubricating medium, a balance chamber, and a sealing space, said walls including a tube surrounding said shaft and separating said balance chamber and said sealing space whereby said balance chamber surrounds and is concentric with said sealing space, said balance chamber containing bodies of said lubricating medium and said fluid, one of said walls providing an opening communicating between said bearing chamber and said balance chamber to communicate between the bodies of lubricating medium therein, said opening being sufficiently small to prevent turbulence in said bearing chamber from being transmitted to said balance chamber; walls defining passage means opening on said fluid and communicating with said body of fluid in said balance chamber and with said fluid in said sealing space, said passage means permitting entry of said fluid into said balance chamber and said sealing space; a bearing in said bearing chamber for journalling said shaft; and a sealing means in said sealing space for sealing said lubricating medium from said fluid.

21. A combination as defined in claim 9 in which said balance chamber is below said bearing chamber, and in which said passage communicating between said balance chamber and said annular chamber is positioned outside said bearing chamber.

EARL MENDENHALL.
JUNIUS B. VAN HORN.